(12) United States Patent
Gomi et al.

(10) Patent No.: US 6,822,706 B2
(45) Date of Patent: Nov. 23, 2004

(54) LIQUID CRYSTAL DISPLAY DEVICE

(75) Inventors: Mika Gomi, Kanagawa (JP); Yoji Inomata, Kanagawa (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 80 days.

(21) Appl. No.: 09/876,603

(22) Filed: Jun. 7, 2001

(65) Prior Publication Data

US 2001/0024252 A1 Sep. 27, 2001

Related U.S. Application Data

(62) Division of application No. 09/082,158, filed on May 20, 1998, now Pat. No. 6,304,736.

(30) Foreign Application Priority Data

May 23, 1997 (JP) ......................................... P. 9-148427

(51) Int. Cl.⁷ ...................... G02F 1/1333; G02F 1/1335
(52) U.S. Cl. .......................................... 349/110; 150/69
(58) Field of Search ........................... 349/69, 110–111, 349/149–150, 152

(56) References Cited

U.S. PATENT DOCUMENTS

| | | | |
|---|---|---|---|
| 4,643,526 A | * 2/1987 | Watanabe et al. | 349/151 |
| 5,130,832 A | 7/1992 | Kawaguchi et al. | |
| 5,680,183 A | 10/1997 | Sasuga et al. | 349/58 |
| 5,745,202 A | 4/1998 | Yamauchi et al. | 349/110 |
| 5,990,989 A | 11/1999 | Ozawa | 349/110 |
| 6,175,395 B1 | * 1/2001 | Yamazaki et al. | 349/44 |

FOREIGN PATENT DOCUMENTS

| | | |
|---|---|---|
| EP | 402106 | 12/1990 |
| EP | 757277 | 2/1997 |
| EP | 0 757 277 A1 | 2/1997 |
| GB | 2268304 | 1/1994 |
| GB | 2298075 | 8/1996 |
| JP | A-57-20778 | 2/1982 |
| JP | A-57-20779 | 2/1982 |

OTHER PUBLICATIONS

PCT, WO98/05999 (English Abstract), Dec. 1998.
PCT, WO96/25687 (English Abstract), Aug. 1996.

* cited by examiner

*Primary Examiner*—Toan Ton
(74) *Attorney, Agent, or Firm*—Pearne & Gordon LLP

(57) ABSTRACT

Without housing a bare chip type liquid crystal driver within a package, to surely shield or absorb the light which reaches the liquid crystal driver so that erroneous display due to the photoelectric effect can be prevented. A light shielding tape 109 is affixed to the top surface of an upper panel 101 of a liquid crystal display panel 10 at an area which is opposite to the mounting area of a liquid crystal driver 107 mounted on the bottom surface of the upper panel 101. The light shielding tape 109 serves to shield the outer light incident on the liquid crystal driver 107. A diffusion sheet 40 composed of a light diffusing area 401 and a light absorbing area 402 located on the outer periphery thereof is arranged below the liquid display panel 10. The light diffusing area 401 serves to diffuse illumination light from a light source 202 to the liquid crystal display panel 10, and the light absorbing area 402 serves to absorb the extraneous light incident on the liquid crystal driver 107.

4 Claims, 3 Drawing Sheets

LIQUID CRYSTAL DISPLAY DEVICE

CROSS-REFERENCE TO RELATED APPLICATION

The present application is a division of application Ser. No. 09/082,158 filed on May 20, 1998 now U.S Pat. No. 6,304,736.

BACKGROUND OF THE INVENTION

1. Field of the Invention

The present invention relates to a liquid crystal display device packaged or mounted on a variety of electric appliances such as a portable telephone terminal, and more particularly to a liquid crystal display device capable of assuring lightproofing of a bare-chip type liquid crystal driver.

2. Description of the Related Art

Conventionally, in a liquid crystal display device to be mounted in a variety of electric appliances, a bare chip constituting a liquid crystal driver therefor is housed in a package so that the light reaching the bare chip is shielded.

With recent progress of low-profiling and down-sizing of a variety of electric appliances, a system of mounting or packaging the liquid crystal driver has been shifted from surface mounting, in which a chip is completely light-shielded by a molding material, to COB (Chip on Board), TCP (Tape Carrier Package) and COG (Chip on Glass). In these systems, in which a bare chip of the liquid crystal driver is-mounted on a circuit board, the bare chip is susceptible to influence by light.

However, in the liquid crystal display device as described above, in which display is generally made by reflection of light, the bare chip which is not housed in a package is susceptible to influence by reflected light for display. Then, because of the reflected light, the liquid crystal driver gives rise to photoelectric effects leading to erroneous display. In addition, mounting the bare chip in a package hinders low-profiling and down-sizing of electric appliances.

SUMMARY OF THE INVENTION

The present invention intends to solve the above conventional problem and to provide a liquid crystal display device capable of surely shielding or absorbing light to reach a liquid crystal driver to prevent erroneous display due to the photoelectric effect of the liquid crystal driver.

Especially the object of the present invention is to prevent erroneous display due to the photoelectric effect of the liquid crystal driver in a very thin type of the liquid crystal display device.

In order to solve the above problem, the liquid crystal display device comprises a liquid crystal driver mounted on a bottom surface of an upper panel constituting a liquid crystal display panel and a light shielding film affixed to a top surface of the upper panel at an area which is opposite to a mounting position of the liquid crystal driver and serves to shield extraneous light incident on the liquid crystal driver.

In accordance with the present invention, without housing the bare chip type liquid crystal driver within a package, the light which reaches the liquid crystal driver is surely shielded or absorbed so that erroneous display due to the photoelectric effect can be prevented.

The first of the present invention is a liquid crystal display device which comprises:

a liquid crystal panel constituted by a first plate disposed on a displaying side, a second plate disposed on a reverse side of the displaying side, and liquid crystal cells held therebetween;

a liquid crystal driver electrically connected with the liquid crystal panel through a circuit pattern;

a light shielding material disposed on the displaying side of said liquid crystal driver so as to prevent an outer light from being incident to said liquid crystal driver. The shielding film surely shields the light to reach the liquid crystal driver.

Preferably the present invention further comprises a diffusion sheet located below the liquid crystal display panel and composed of a light diffusing area and a light absorbing area located on the outer periphery thereof, the light diffusing area serving to diffuse illumination light from a light source to the liquid crystal display panel, and the light absorbing area serving to absorb the extraneous light incident on the liquid crystal driver. The light absorbing area of the diffusing sheet absorbs the extraneous light incident on the liquid crystal driver so that the light to reach the liquid crystal driver is surely shielded.

Preferably the present invention is characterized in that the light which reflects from said diffusion sheet to reach the liquid crystal driver is shielded by resin applied for protecting a transparent electrode of the liquid crystal display panel. The resin shields the light reflected by the diffusion sheet to reach the liquid crystal driver.

Preferably the invention is characterized in that the light shielding film, light absorbing area of the diffusion sheet and resin are colored in black. This configuration improves the shielding effect of light to reach the liquid crystal driver.

DESCRIPTION OF THE PREFERRED EMBODIMENTS

Embodiment 1

Figure 1:
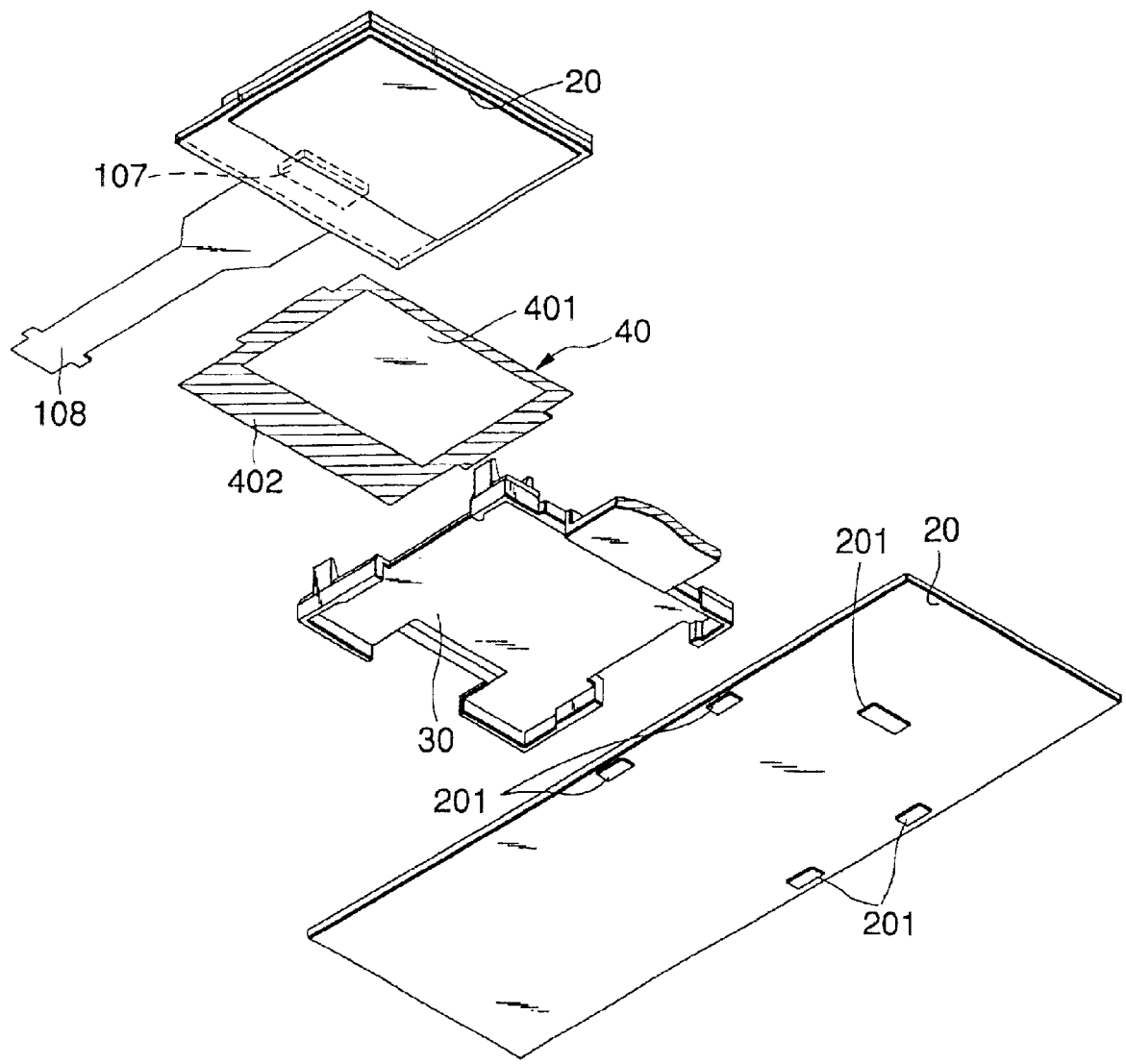
FIG. 1 is a perspective view of the exploded main part of a liquid crystal display device according to a first embodiment of the present invention.
Figure 2:
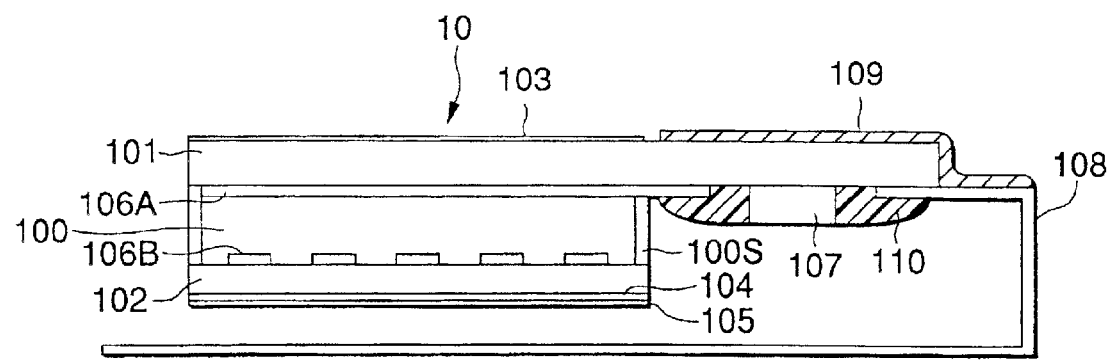
FIG. 2 is a side view of the liquid crystal panel portion of the liquid crystal display device according to the first embodiment of the present invention.
Figure 3:
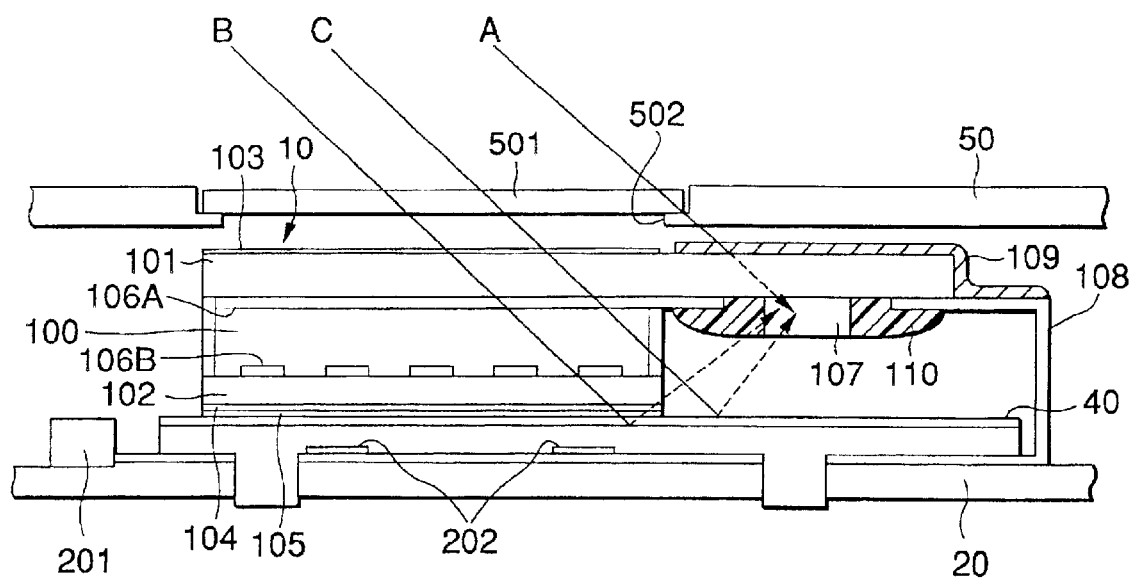
FIG. 3 is a side view of the entire configuration of the liquid crystal display device according to the first embodiment of the present invention

Now referring to FIGS. 1 to 3, an explanation will be given of a first embodiment of the present invention. FIG. 1 is a perspective view of the exploded main part of a liquid crystal display device according to the first embodiment of the present invention. FIG. 2 is a side view of the liquid crystal panel portion of the liquid crystal display device according to the embodiment of the present invention. FIG. 3 is a side view of the entire configuration of the liquid crystal display device according to the embodiment of the present invention.

The liquid crystal display device to be mounted in a portable telephone terminal, as seen from FIGS. 1 to 3, includes a liquid display panel 10, a circuit board 20 and a holder 30 for holding the liquid crystal display panel 10 on the circuit board 20.

The liquid display panel 10, as apparent from FIG. 2, includes an upper panel 101 as a first plate, a lower panel 102 as a second plate, an upper polarized plate 103 stacked on the upper surface of the upper panel 101, a lower polarized plate 104 stacked on the lower surface of the lower panel 102, a reflection plate 105 affixed to the lower surface of the lower polarized plate and having a certain reflectivity and permittivity, a first transparent electrode 106A arranged on the bottom surface of the upper panel 101 opposite to the lower panel 102, a second transparent electrode 106B arranged on a upper surface of the lower panel 102, liquid crystal cell 100 sandwiched between the upper and lower panel 101, 102 and a liquid crystal driver 107 electrically connected to the first transparent electrode 106A.100s is a seal portion. The one end of a film carrier 108 is connected to the upper panel 101 opposite to a mounting area of the liquid crystal driver 107, whereas the other end of the film carrier 108 is folded back to the bottom surface of the liquid crystal panel 10. The folding-back terminal is connected to a connector 201 mounted on the circuit board 20. And the film carrier 108 is consist of a resin film and circuit pattern formed on the resin film, and also act as a heat seal. A light shielding film 109 is affixed to the upper surface of the upper panel 101 opposite to the mounting area of the liquid crystal driver 107 and a connecting portion of the film carrier 108. The light shielding film 109 is colored in black in order to enhance the light shielding effect. Silicon resin as a light shielding resin 110 is applied to the bottom surface of the upper panel 101 in order protect the first transparent electrode 106. The silicon resin 110 is colored in black in order to enhance the light shielding effect of the liquid crystal driver 107.

A diffusion sheet 40 is affixed to the top surface of the holder which is opposite to the bottom surface of the liquid crystal display panel Alight diffusion area 401 of the diffusion sheet, opposite to the reflection plate 105 of the liquid display panel 10, is colored in white as shown in FIG. 1. A light absorption area 402, which is located at the outer periphery of the light diffusion area 401 and opposite to the bottom surface of the upper panel, is colored in black.

Four light sources 202 each being an LED are mounted oppositely to both sides of the holder 30 so that the light radiated by the light sources 202 are diffused with no luminance variation by the light diffusion area 401 of the diffusion sheet 40 and the liquid crystal display panel 10 is illuminated from its bottom side.

Additionally, in FIG. 3, reference numeral 50 denotes a housing panel of an electric appliance such as a portable telephone terminal, and reference 501 denotes a transparent housing cover which covers a display window made on the housing panel oppositely to the upper polarized plate of the liquid display panel 10.

Now referring to FIG. 3, an explanation will be given of the operation of the embodiment configured as described above. The liquid display device according to the embodiment adopts a semi-translucent display system as a light gathering system in which the reflection plate 105 having a certain reflectivity and permeability is arranged on the bottom surface of the lower polarized plate 104 so that at a bright site, incident light rays (outer light rays) A and B are used (reflection type) whereas in a dark side, the light sources are lit up (transparent type).

The operation where the extraneous light rays A and B are used for display is as follows. The light ray A having certain energy, which is incident through the housing cover 501, is to enter the liquid crystal driver 107 from the upper panel 101. The light ray A, however, is shielded by the light shielding film 109 so that it does not reach the liquid crystal driver 107. A part of the incident light ray B having certain energy is reflected by the diffusion sheet 40. The reflected light reaches the liquid crystal driver 107, but is shielded by the silicon resin 110. A part of the incident light ray B is also absorbed by the light absorption area 402 of the diffusion sheet 40 so that it does not reach the liquid crystal driver 107.

Thus, in accordance with this embodiment, the light ray to directly reach the liquid crystal driver is shielded by the light shielding tape 109, and the light ray which reaches the liquid crystal driver and is reflected therefrom can be partially absorbed by the diffusion sheet 40. Therefore, without housing the bare chip type liquid crystal driver within a package, the light which reaches the liquid crystal driver is surely shielded or absorbed so erroneous display due to the photoelectric effect can be prevented.

Embodiment 2

Figure 4:
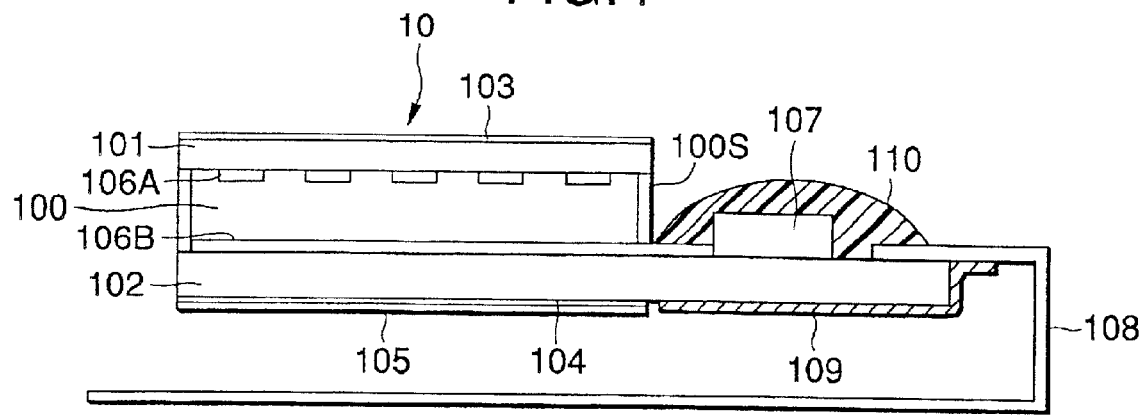
FIG. 4 is a side view of the liquid crystal panel portion of the liquid crystal display device according to the second embodiment of the present invention.

Now referring to FIG. 4, an explanation will be given of a second embodiment of the present invention. FIG. 4 is a side view of the liquid crystal panel portion of TCP type of the liquid crystal display device according to the second embodiment of the present invention.

In the second embodiment, a liquid crystal driver 107 is mounted on a displaying side surface on a extended part of a lower panel 102, and electrically connected to the first transparent electrode 106A And the structure is characterized in that a displaying side surface of the liquid crystal driver 107 is covered with a light shielding resin and a light shielding tape is affixed on the reverse side of the extended part of the lower panel corresponding to opposite region to a mounting area of the liquid crystal driver 107.

Another parts are constructed in a same manner as the first embodiment, same members are numbered same as the first embodiment.

According to the second embodiment, both surface of the a bare chip of the liquid crystal driver 107 are covered with a light shielding resin 110 and light shielding tape 107, thereby the light which reaches the liquid crystal driver 107 is surely shielded or absorbed so that the erroneous display due to the photoelectric effect can be prevented.

Embodiment 3

Figure 5:
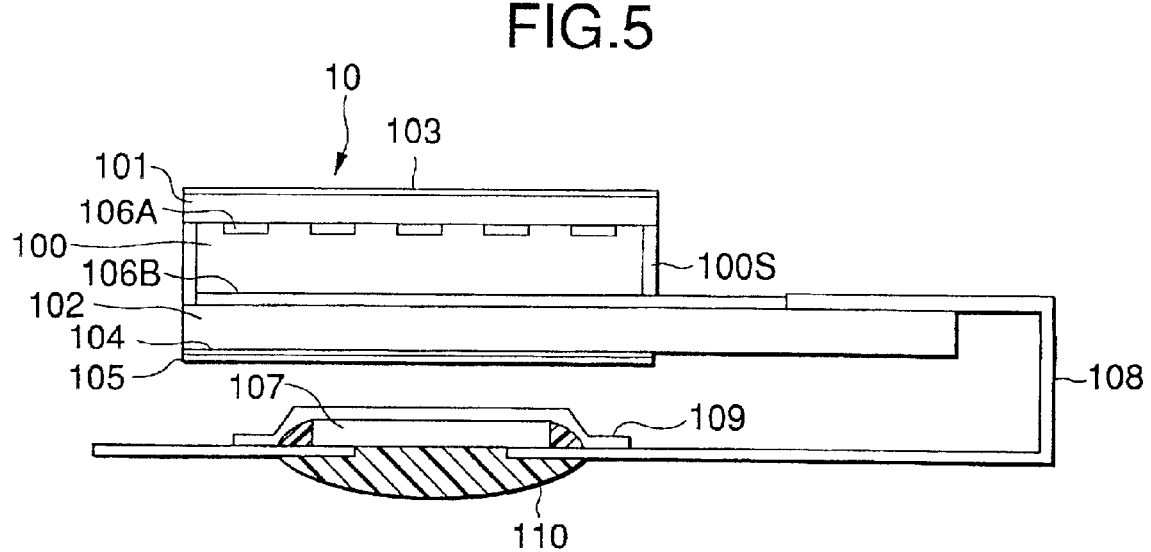
FIG. 5 is a side view of the liquid crystal panel portion of the liquid crystal display device according to the third embodiment of the present invention.

Now referring to FIG. 5, an explanation will be given of a third embodiment of the present invention. FIG. 5 is a side view of the liquid crystal panel portion of TCP type of the liquid crystal display device according to the third embodiment of the present invention.

In the third embodiment, a liquid crystal driver 107 is mounted on a displaying side surface of the folded portion of a film carrier 108 folded under the display panel 10, and electrically connected to the circuit pattern on the film carrier in a face down manner. In FIG. 5, same members are numbered same as the first embodiment. And the structure is characterized in that a both surface of a bare chip of the liquid crystal driver 107 are covered with a light shielding resin 110 and a light shielding tape 109, respectively.

Another parts are constructed same as the first embodiment, same members are numbered same as the first embodiment.

According to the third embodiment, the liquid crystal driver 107 is disposed under the display panel 10 and both surface of the a bare chip of the liquid crystal driver 107 are covered with a light shielding resin 110 and light shielding tape 109, thereby the light which reaches the liquid crystal driver 107 is surely shielded or absorbed so that the erroneous display due to the photoelectric effect can be prevented.

Embodiment 4

Figure 6:
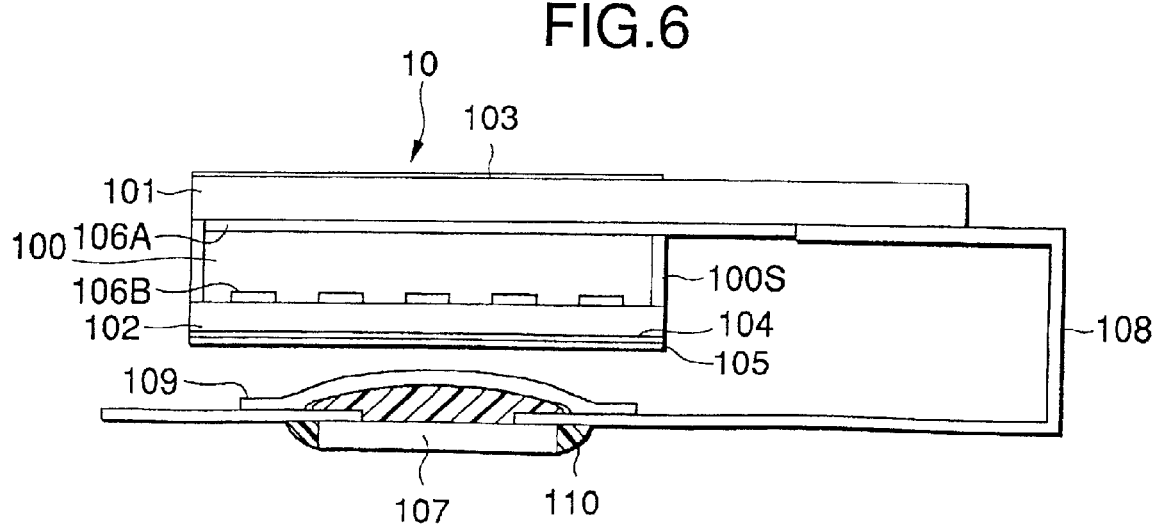
FIG. 6 is a side view of the liquid crystal panel portion of the liquid crystal display device according to the fourth embodiment of the present invention.

Now referring to FIG. 6, an explanation will be given of a fourth embodiment of the present invention. FIG. 6 is a side view of the liquid crystal panel portion of TCP type of the liquid crystal display device according to the third embodiment of the present invention.

In the fourth embodiment, a liquid crystal driver 107 is mounted on a displaying side surface of the folded portion of a film carrier 108 folded under the display panel 10, like as the third embodiment. A chip of the liquid crystal display device is electrically connected to the circuit pattern on the film carrier in a face up manner. In FIG. 6, same members are numbered same as the first embodiment. And the structure is characterized in that a displaying side surface of a bare chip of the liquid crystal driver 107 is covered with a light shielding resin 110 and a light shielding tape 109.

Another parts are constructed same as the first embodiment, same members are numbered same as the first embodiment.

And the present invention is applicable to resin shield type of a chip as well as bare chip type of a liquid crystal driver. In the case that resin shield type of the chip is a thin type, the resin is not able to prevent a incident light to the chip sufficiently. But according to the present invention, the incident light to the chip is shielded sufficiently.

As described above, without housing the bare chip type liquid crystal driver within a package, the light which reaches the liquid crystal driver is surely shielded or absorbed so that the erroneous display due to the photoelectric effect can be prevented.

What is claimed is:

1. A liquid crystal display device comprising:

a liquid crystal panel comprising liquid crystal cells, a first plate disposed on a displaying side of the cells, and a second plate disposed on a reverse side of the cells;

a liquid crystal driver electrically connected with the liquid crystal panel through a circuit pattern;

a first light shielding material disposed adjacent a face of said liquid crystal driver so as to prevent an outer light from being incident to said liquid crystal driver;

a second light shielding material disposed adjacent an opposite face of said liquid crystal driver so as to prevent an outer light from being incident to said liquid crystal driver; and a diffusion sheet located adjacent said liquid crystal display panel, wherein said diffusion sheet comprises a light diffusing area and a light absorbing area located on the outer periphery thereof, the light diffusing area serving to diffuse illumination light from a light source to the liquid crystal display panel, and the light absorbing area serving to absorb the extraneous light incident on said liquid crystal driver.

2. The liquid crystal display device according to the claim 1, wherein said second plate has a displaying side facing the liquid crystal cells and an opposite reverse side and said liquid crystal driver is mounted on the displaying side of the second plate, and said first light shielding material comprised a light shielding film affixed to the reverse side of the second plate.

3. A liquid crystal display device comprising:

a liquid crystal panel comprising liquid crystal cells, a first plate disposed on a displaying side of the cells, and a second plate disposed on a reverse side of the cells;

a liquid crystal driver electrically connected with the liquid crystal panel through a circuit pattern;

a first light shielding material disposed adjacent a face of said liquid crystal driver so as to prevent an outer light from being incident to said liquid crystal driver;

a second light shielding material disposed adjacent an opposite face of said liquid crystal driver so as to prevent an outer light from being incident to said liquid crystal driver; and a light absorbing material disposed to prevent internal direction of an outer light incident to the liquid crystal driver.

4. A liquid crystal display device comprising:

a liquid crystal panel supported by a film carrier, the liquid crystal panel comprising liquid crystal cells, a first plate disposed on a displaying side of the cells, and a second plate disposed on a reverse side of the cells;

a liquid crystal driver electrically connected with the liquid crystal panel through a circuit pattern;

a first light shielding material disposed adjacent a face of said liquid crystal driver so as to prevent an outer light from being incident to said liquid crystal driver; and a second light shielding material disposed adjacent an opposite face of said liquid crystal driver so as to prevent an outer light from being incident to said liquid crystal driver, wherein the liquid crystal driver is provided on a surface of the film carrier, said film carrier comprising said circuit pattern formed on a resin film.

* * * * *

UNITED STATES PATENT AND TRADEMARK OFFICE
CERTIFICATE OF CORRECTION

PATENT NO.   : 6,822,706 B2
DATED        : November 23, 2004
INVENTOR(S)  : Mika Gomi et al.

It is certified that error appears in the above-identified patent and that said Letters Patent is hereby corrected as shown below:

Column 3,
Line 43, please delete "Alight" and insert therefor -- A light --.

Column 6,
Line 35, after "material disposed" please insert -- adjacent said liquid crystal driver --.

Signed and Sealed this

Eighth Day of March, 2005

JON W. DUDAS
*Director of the United States Patent and Trademark Office*